(No Model.)

A. A. McINTOSH.
CHECK ROW CORN PLANTER.

No. 257,037. Patented Apr. 25, 1882.

WITNESSES:
F. McArdle
C. Sedgwick

INVENTOR:
A. A. McIntosh
BY Munn & Co.
ATTORNEYS.

UNITED STATES PATENT OFFICE.

ALFRED A. McINTOSH, OF LINCOLN, NEBRASKA.

CHECK-ROW CORN-PLANTER.

SPECIFICATION forming part of Letters Patent No. 257,037, dated April 25, 1882.

Application filed January 24, 1882. (No model.)

*To all whom it may concern:*

Be it known that I, ALFRED A. MCINTOSH, of Lincoln, in the county of Lancaster and State of Nebraska, have invented certain new and useful Improvements in Check-Row Corn-Planters, of which the following is a full, clear, and exact description.

Reference is to be had to the accompanying drawings, forming part of this specification, in which similar letters of reference indicate corresponding parts in all the figures.

Figure 1:
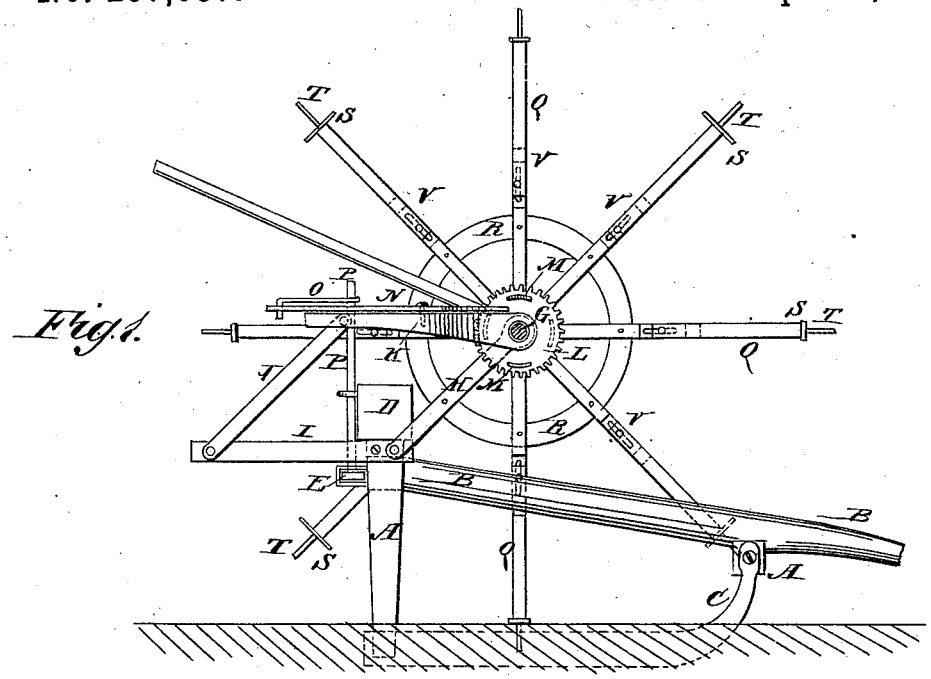
Figure 2:
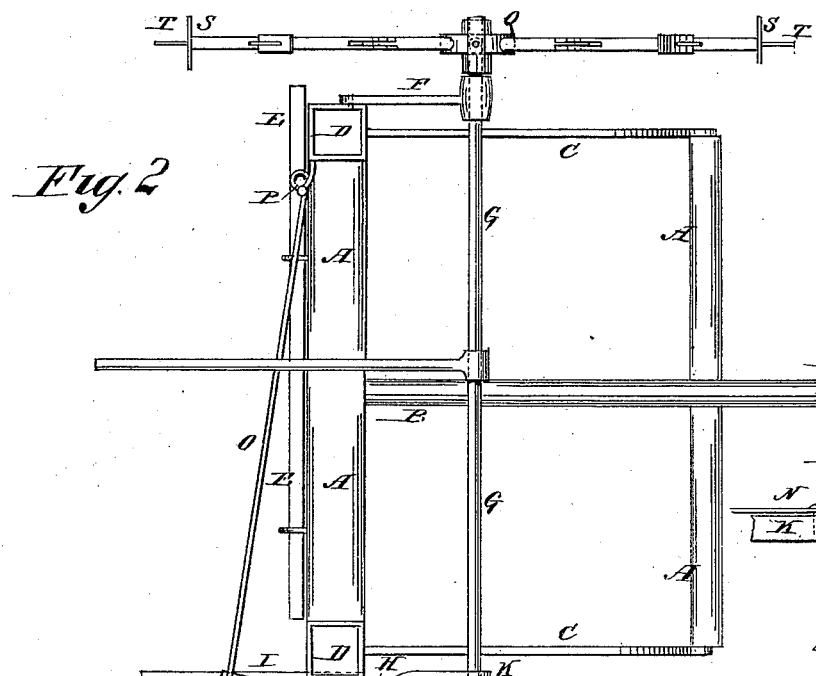
Figure 3:
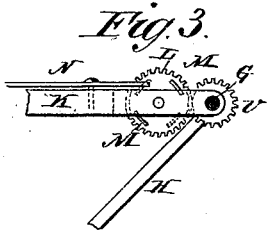

Figure 1 is a side elevation of my improvement, partly in section. Fig. 2 is a plan view of the same. Fig. 3 is a sectional side elevation of a part of the same, showing a modification.

The object of this invention is to secure accuracy in dropping the seeds, so that the hills will be at uniform distances apart whether the machine be used upon level or uneven ground, so that the field can be planted in accurate check-rows.

The invention consists in the combination, with the seed-boxes, the spoke-wheels, and their shaft, of pivoted bearing-bars, a stationary horizontal bar attached to a seed-box, a pivoted connecting-bar, and a forked lever-carrying bar, whereby the said forked bar is kept in a horizontal position as the shaft rises and falls; also, in the combination, with the spoke-wheel shaft, of the cam-wheel, the forked lever pivoted to the horizontal forked bar, the connecting-rod, and the seed-dropping slide, whereby the slide will be vibrated uniformly; and also in the combination, with the spokes of the wheel, of the cross-heads provided with spikes and arranged alternately with and at right angles to the plane of the wheel, whereby the lines of the cross-rows will be indicated, as will be hereinafter fully described.

A represents the frame, B the tongue, C the channel-opening runners, D the seed-boxes, and E the seed-dropping slide, of an ordinary corn-planter.

To the outer side of one of the seed-boxes D is pivoted the rear end of a bar, F, in bearings in the forward end of which revolves a shaft, G. The shaft G also revolves in bearings in the forward end of the bar H, the rear end of which is pivoted to the forward end of a horizontal bar, I, attached to the outer side of the other seed-box D.

To the rear end of the bar I is pivoted the lower end of a bar, J, which is placed parallel with the bar H, and is pivoted at its upper end to the rear end of the bar K. The forward end of the bar K is forked, and the ends of its branches are pivoted to the shaft G upon the opposite sides of the end of the bar H.

To the shaft G, within the fork of the bar K, is attached a wheel, L, upon the outer part of which are formed, or to it are attached, four inclined projections or cams, M, at equal distances apart, two upon each side of the wheel and alternating with each other.

To the forked bar K is pivoted a lever, N, the forward end of which is forked and receives within its fork the wheel L, so that the lever N will be vibrated by the cams of the said wheel L.

To the rear end of the forked lever N is pivoted the end of a connecting-rod, O, the other end of which is pivoted to the upper end of the lever P, which is pivoted to the frame A, and is connected at its lower end with the said seed-dropping slide E, so that the seed-dropping slide E will be operated to drop the seed by the advance of the machine. Several holes are formed in the rear part of the forked lever N to receive the end of the connecting-rod O, so that the said rod can be adjusted farther from or closer to the fulcrum of the said lever N, to give the seed-dropping slide a greater or a less movement, as may be desired. With this construction the forked bar K, that carries the forked lever N, will always be horizontal, and will thus retain the same relative position with respect to the shaft G whether the said shaft rises or falls, so that the seed will always be dropped at uniform distances apart. With this construction four hills will be dropped at each revolution of the shaft G.

To the ends of the shaft G are attached spoke-wheels Q, the spokes of which are strengthened in position by bands R, attached to them. The wheels Q are made with eight spokes, and to the outer ends of the spokes are attached cross-heads S to mark the ground, and spikes T to enter the ground, prevent the said spokes from slipping, and give the spokes a sufficient hold upon the ground to revolve the spoke-wheels Q and the shaft G and operate the seed-dropping slide E. The spoke-wheels Q are so arranged that the alternate spokes will come to the ground in line with the hills, and thus mark the cross-rows. The cross-heads S of these spokes are placed at right angles with the plane of the wheels, while the cross-heads S of the other spokes are placed in the plane of the wheel to make a different mark, so that the driver will know the lines of the cross-rows. Each spoke of the spoke-wheels is made in two parts, with a slot in the end of one part, a tenon in the end of the other part, and slots to receive the fastening-bolt, thus forming a slip-joint, V, so that the said spokes can be readily lengthened and shortened, as may be desired.

When it is desired to plant three hills at each revolution of the shaft G the cam-wheel L is detached from the shaft G, is journaled to and between the branches of the forked end of the bar K, and has gear-teeth formed in its edge to mesh into the teeth of the gear-wheel U attached to the shaft G, the teeth of the gear-wheels being so arranged that a revolution of the gear-wheel U will rotate the cam-wheel L through exactly three-fourths of a revolution. In this case the the spoke-wheels Q should each be made with six spokes, so that the lines of the cross-rows will be accurately marked.

Having thus fully described my invention, I claim as new and desire to secure by Letters Patent—

1. In a check-row corn-planter, the combination, with the seed-boxes D, the spoke-wheels Q, and the shaft G, of the pivoted bars F H, the stationary horizontal bar I, the pivoted connecting-bar J, and the forked bar K, substantially as herein shown and described, whereby the said forked bar is kept in a horizontal position as the shaft G rises and falls, as set forth.

2. In a check-row corn-planter, the combination, with the shaft G, of cam-wheel L, the forked lever N, pivoted to the horizontal forked bar K, the connecting-rod O, and the seed-dropping slide E, substantially as herein shown and described, whereby the said dropping-slide will be vibrated uniformly, as set forth.

3. In a check-row corn-planter, the combination, with the spokes of the wheel Q, of the cross-heads S, provided with the spikes T, and arranged alternately with and at right angles to the plane of the wheel, substantially as herein shown and described, whereby the lines of the cross-rows will be indicated, as set forth.

ALFRED A. McINTOSH.

Witnesses:
FRED SCHMIDT,
J. M. IMMEL.